United States Patent [19]

O'Sullivan

[11] Patent Number: 5,606,803
[45] Date of Patent: Mar. 4, 1997

[54] TAPE MEASURE AND FIXTURE

[76] Inventor: Joseph O'Sullivan, 38 Scituate St., Arlington, Mass. 02174

[21] Appl. No.: 510,974

[22] Filed: Aug. 3, 1995

[51] Int. Cl.⁶ .................................................. G01B 3/10
[52] U.S. Cl. ............................................. 33/770; 33/759
[58] Field of Search ............................ 33/755, 757, 759, 33/761, 766, 768, 770, 767

[56]     References Cited

U.S. PATENT DOCUMENTS

| 421,133 | 2/1890 | Grierson | 33/770 |
|---|---|---|---|
| 650,136 | 5/1900 | Runnett | 33/770 |
| 1,713,891 | 5/1929 | Dooley | 33/770 |
| 3,281,943 | 11/1966 | Maksim, Jr. | 33/768 |
| 3,744,134 | 7/1973 | Zima, Jr. | 33/768 |
| 4,603,481 | 8/1986 | Cohen et al. | 33/768 |
| 5,214,859 | 6/1993 | Buhler | 33/770 |
| 5,295,308 | 3/1994 | Stevens et al. | 33/770 |

FOREIGN PATENT DOCUMENTS

| 243335A1 | 2/1987 | Germany | 33/770 |
|---|---|---|---|

*Primary Examiner*—G. Bradley Bennett
*Attorney, Agent, or Firm*—Mark P. White

[57]     ABSTRACT

An improved carpenter's tape measure is provided, containing a fixture allowing for the easy and precise measurements from corner to corner. The tape measure comprises a tape stored upon a drum within a housing, and further comprises the fixture, which slides along the tape while in use, and which may be stored within the housing when not in use. A locking mechanism is integrated with the fixture so that the tape may be locked while the fixture is within the housing in stored position, as well as outside the housing.

8 Claims, 5 Drawing Sheets

TAPE MEASURE AND FIXTURE

BACKGROUND OF THE INVENTION

1. Field of the Invention

The present invention relates to tape measure apparatus, and more particularly to tape measures configured to easily and accurately measure distances from corner to corner, and further to fixtures for use in conjunction with tape measures providing an easy and accurate measurement from corner to corner.

2. Description Relative to the Prior Art

There are many inventions relating to carpenter's tape measures, and many varieties of these measures in common use.

Generally speaking, the carpenter's tape measure consists of a metal or plastic tape blade which is coiled around a drum located within a housing. The blade is generally terminated with an L-shaped end piece, with one leg of the L parallel to the blade end, and the other leg perpendicular to the blade end. The blade may be withdrawn from the housing by pulling the tape through an opening in the housing, and retracts back into the housing through the reverse of the withdrawal process. The L-shaped end piece serves the dual function of facilitating measurement of the work piece, and of preventing retraction of the tape blade entirely within the housing.

Practically all modern carpenter's tape measures contain locking mechanisms, through the use of which the tape may be locked in position while partially withdrawn from the housing.

As commonly used, a portion of the tape is pulled out of the housing, and the end piece aligned with one end of the work piece to be measured, while the tape extends over the length of the work and beyond.

When the tape measure is used to make internal corner-to-corner measurements, in a room, for example, many carpenters will place the end piece 2 against the far corner 4, extend the tape along the floor 6, and bend the blade of the tape into the near corner 8, as shown in FIG. 1.

The technique of FIG. 1 is does not provide a high degree of accuracy, however, because the tape will naturally assume a radius as it passes the near corner 8, and the user must estimate where the tape blade would intersect with the corner if it could be made to conform exactly with the corner. The tendency of the tape to form said radius is exacerbated in most commercially available tape blades which have a curved cross section to provide a degree of rigidity to the blade when extended without support.

Several techniques have been used to overcome this problem. The most common of these is to use the housing of the tape measure an extension of the tape blade, and to place the housing itself into the near corner 8 and resting on the floor 6, while extending the tape so that the end piece fits exactly into the far corner 4, as shown in FIG. 2. Thus, the length to be measured equals the length of the tape from the far corner 6 to the near end of the tape housing 10, plus the length of the tape housing itself.

This technique has the shortcoming that it is awkward to perform, since the user is required to kneel or squat down while so doing. As a result, many carpenters continue to use the technique shown in FIG. 1, despite its inherent inaccuracy.

The current invention allows for accurate corner to corner measurements without the drawbacks of the technique of FIG. 1.

SUMMARY OF THE INVENTION

A general object of the current invention is to provide an inexpensive device to allow accurate measurement in conjunction with a calibrated tape.

A specific object is to provide a fixture which can be used with an existing carpenter's tape measure which allows accurate measurements of interior corners.

A further specific object is to provide a carpenter's tape measure which incorporates said fixture into the tape measure.

According to one aspect of the invention, the fixture comprises a base portion containing a slot through which the tape blade can pass, a nose portion affixed to the base portion, and extending along the longitudinal axis of the fixture, the height of said nose portion extending to below the location of the slot in the base portion, and a flexible indicator portion having a free end and a secured end, said indicator being rigidly affixed at the secured end to the base portion above the slot, and oriented parallel to the longitudinal axis of the base.

The end of the indicator extends at the free end exactly to the nose portion end, so that when the tape blade is inserted in the slot, the indicator lies parallel to the tape blade.

In use, the indicator is abutted to the interior wall, with the tape blade inserted in the slot and bent up and along the wall in a radius, so that the indicator indicates the calibration on the tape blade corresponding to the distance to the wall.

According to another aspect of the invention, a tape measure is provided to which the fixture is attached, wherein the fixture may be retained within the housing when the tape measure is not in use.

BRIEF DESCRIPTION OF THE DRAWINGS

These, and further features of the invention, may be better understood with reference to the accompanying specification and drawings depicting the preferred embodiment, in which:

FIG. 6C shows a front view of the locking mechanism in open position with the first preferred embodiment of the fixture, with the fixture free to withdraw from the housing.

DETAILED DESCRIPTION OF THE PREFERRED EMBODIMENTS

Figure 1:
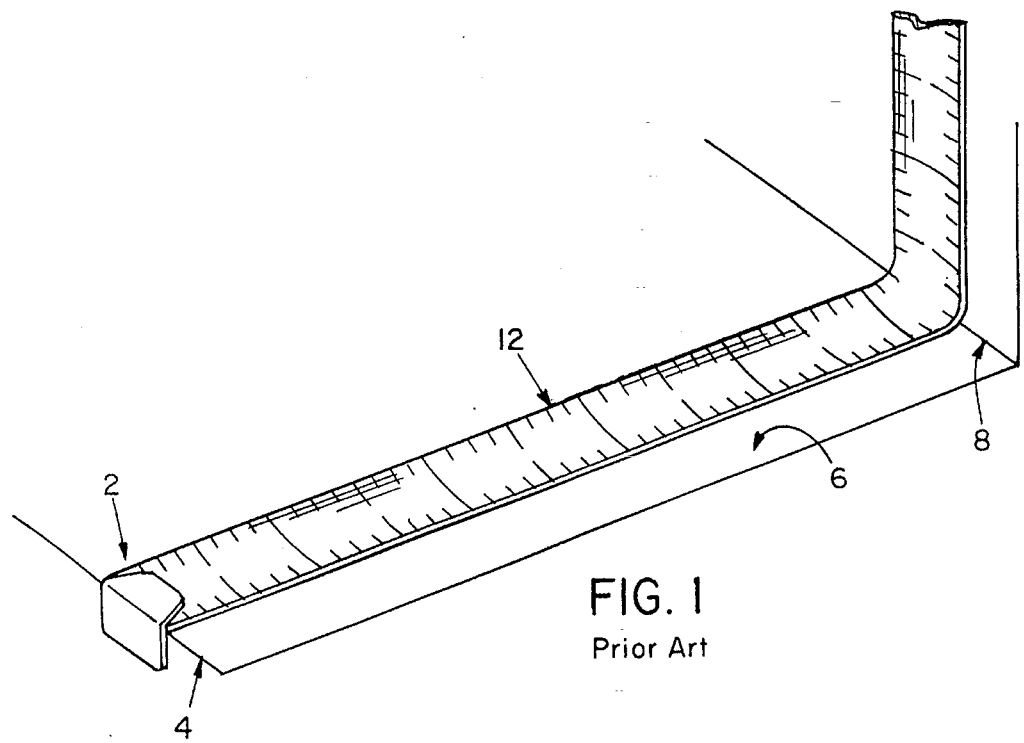
FIG. 1 (Prior Art) depicts the traditional method of making a corner-to-corner measurement using a carpenter's tape rule.
Figure 2:
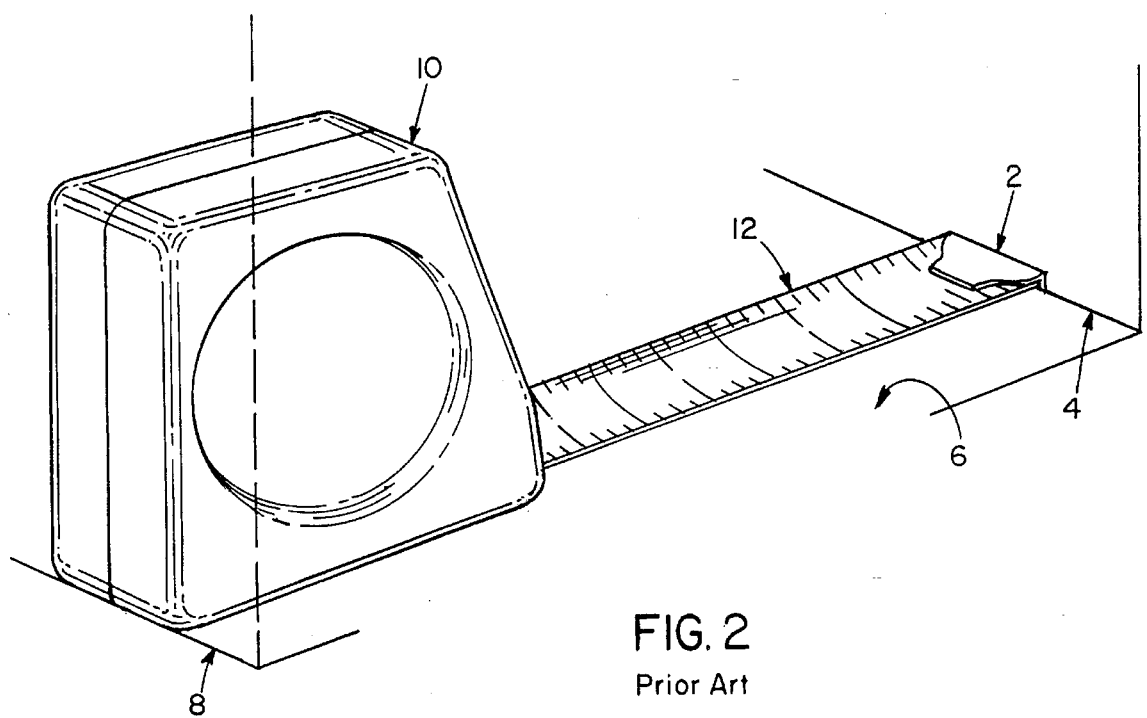
FIG. 2 (Prior Art) depicts the use of the tape measure housing to make an accurate corner-to-corner measurement.
Figure 3A:
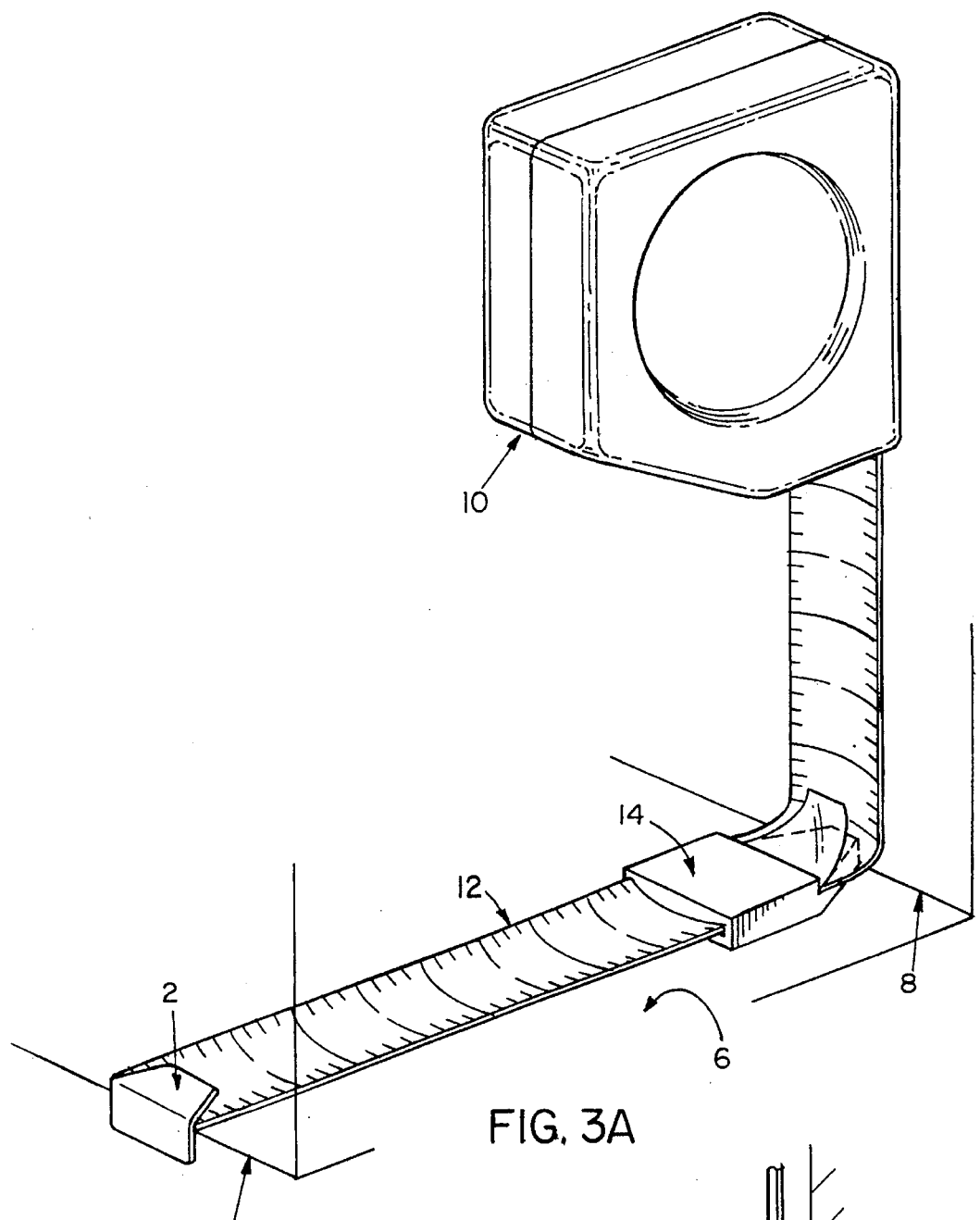
FIG. 3A depicts the use of the current invention in making a corner-to-corner measurement.

The use of the fixture in conjunction with the tape measure is shown by the isometric drawing of FIG. 3A. The fixture itself is shown in FIGS. 4A, 4B and 4C.

Figure 4A:
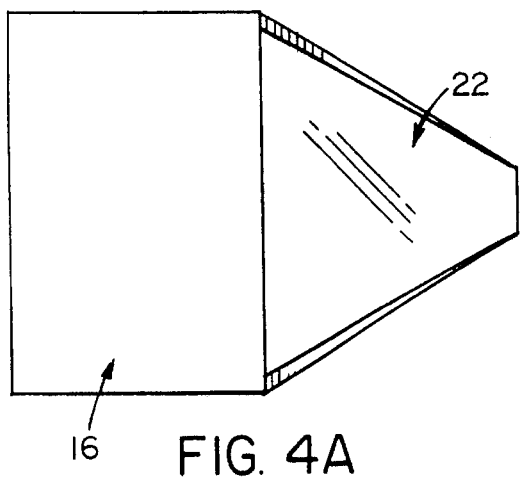
FIG. 4A shows a plan view of the first preferred embodiments of the fixture.
Figure 4B:
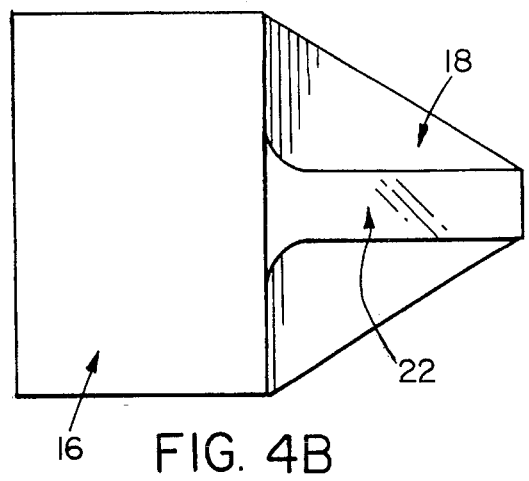
FIG. 4B shows a plan view of the second preferred embodiment of the fixture.
Figure 4C:
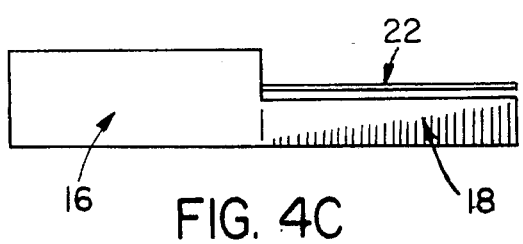
FIG. 4C shows a side view of the first and second embodiments of the fixture.

Referring first to FIGS. 4A and 4B, the fixture is seen to comprise a base 16, to which is affixed a nose portion 18. A flexible indicator 22 is further affixed to the base portion 16, and consists of a flat sheet of flexible material such as plastic. This flexible indicator extends parallel to the top of the nose portion exactly to the end of said nose portion.

A slot 24 passes through the base 16 parallel to the top of the nose portion 18, and parallel to the indicator, so that when a tape blade 12 is inserted in the slot 24, the indicator 22 lies directly above and parallel to the tape blade 12, which, in turn, lies directly above and parallel to the nose portion 18.

Figure 4D:
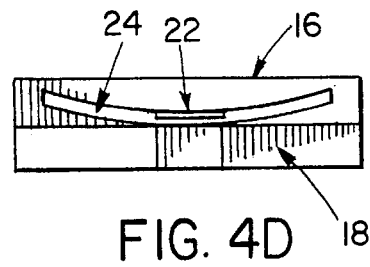
FIG. 4D shows a front view of the second preferred embodiment.

As was previously noted, the tape blade 12 generally has a curved cross section. Thus the slot 24 is likewise curved, as seen in FIG. 4D.

Figure 3B:
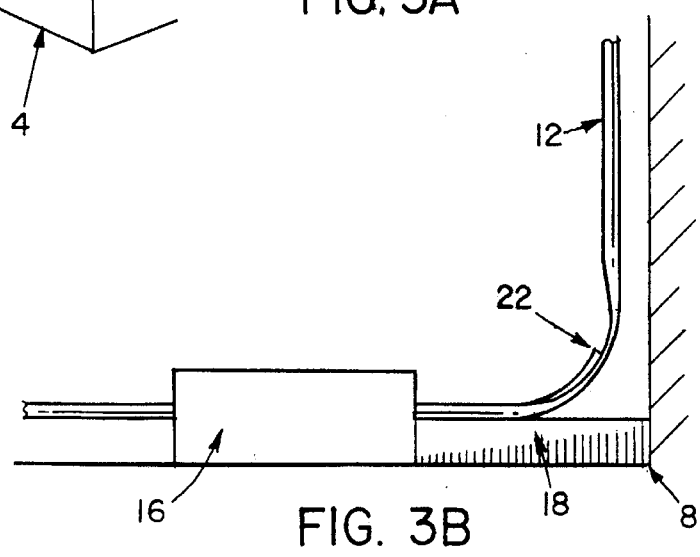
FIG. 3B depicts a close-up view of the fixture while making a corner measurement.

Referring now to FIG. 3A it is seen that the measurement is taken by pushing the end piece 2 of the tape blade 12 into the far corner 4, and then pushing the nose portion of the indicator 14 into the near corner 8, while allowing the remaining portion of the tape blade 12 to run up the wall perpendicular to the floor 6, as shown. As seen in FIGS. 3A and 3B, the tape blade 12 will form a radius as it exits from the slot of the base portion of the fixture 14 and ascends the wall, and the indicator 22 will be forced into a curve as well in conformance with the tape blade 12.

FIG. 3B shows a side view of the fixture 14, and especially reveals the coincidence of the indicator 22 and the tape blade 12.

It becomes clear from studying FIG. 3B that the end of the indicator 22 will read on the tape blade 12 the exact distance to the corner 8.

In the first preferred embodiment of the fixture, as shown in FIG. 4A the indicator 22 has a shape which is broad at the end, closes to the base region, and then tapers to a narrow dimension at the other end.

Figure 7:
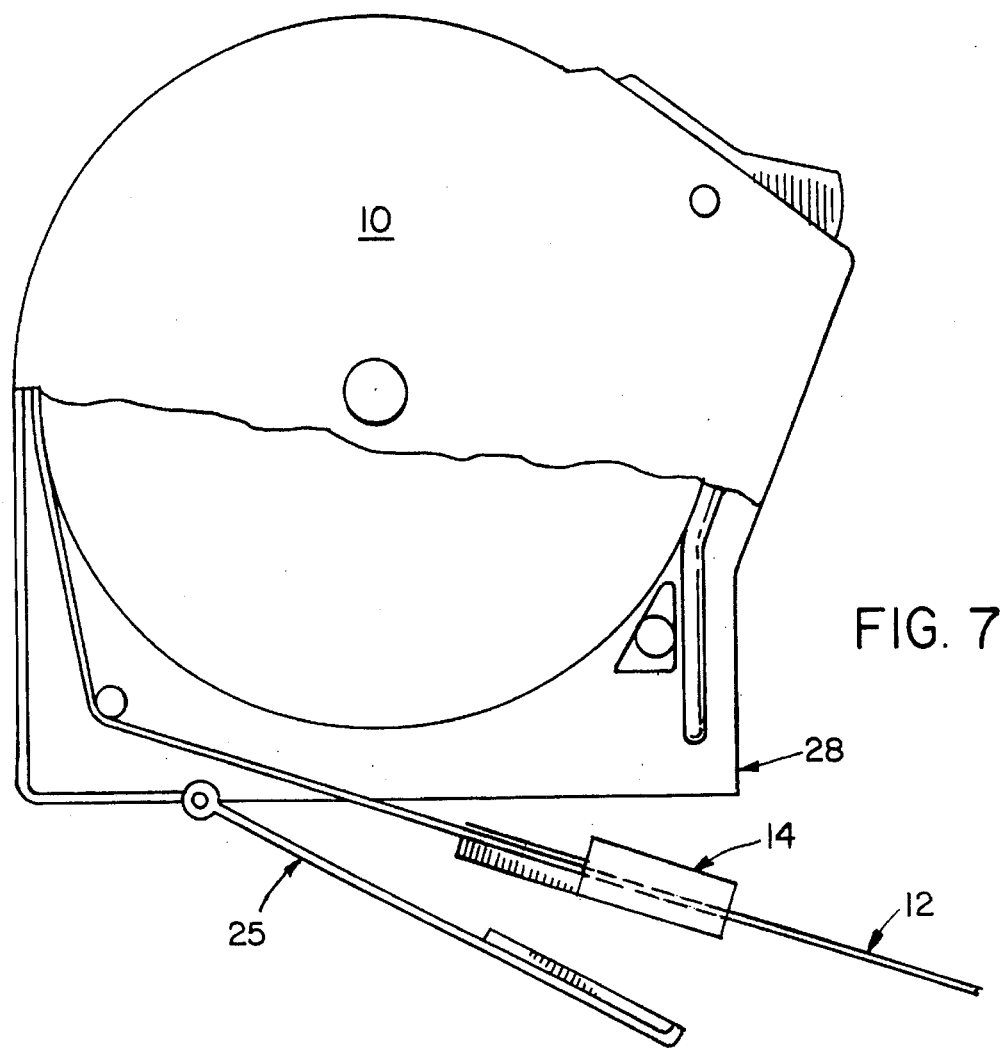
FIG. 7 shows the third preferred embodiment, in which the housing contains a door to allow the retention and withdrawal of the fixture, and in which the door is open.
Figure 8:
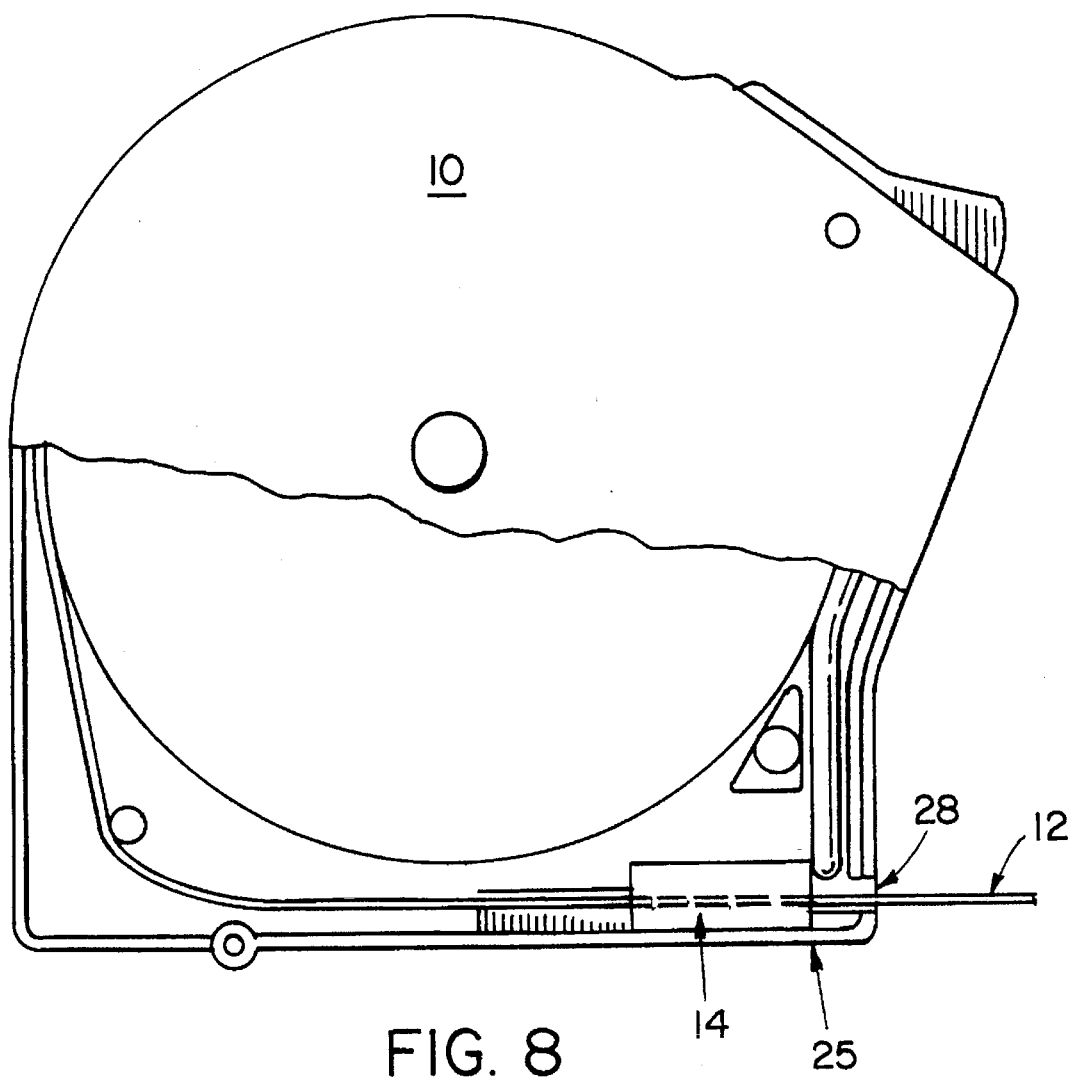
FIG. 8 shows the third preferred embodiment, in which the housing contains a door to allow the retention and withdrawal of the fixture, and in which the door is closed.

In a second preferred embodiment, as shown in FIG. 7, the fixture 14 is incorporated into a tape measure so that the indicator, when not in use, is stored within the housing 10 of the tape measure. In the embodiment of FIG. 7 a door 25 at the bottom the housing opens to allow the fixture to be inserted into the housing, since the opening 28 through which the tape blade is withdrawn is too narrow to permit the fixture 14 to pass. In FIG. 8 the door 25 is closed and the fixture 14 is trapped within the housing 10.

Figure 5:
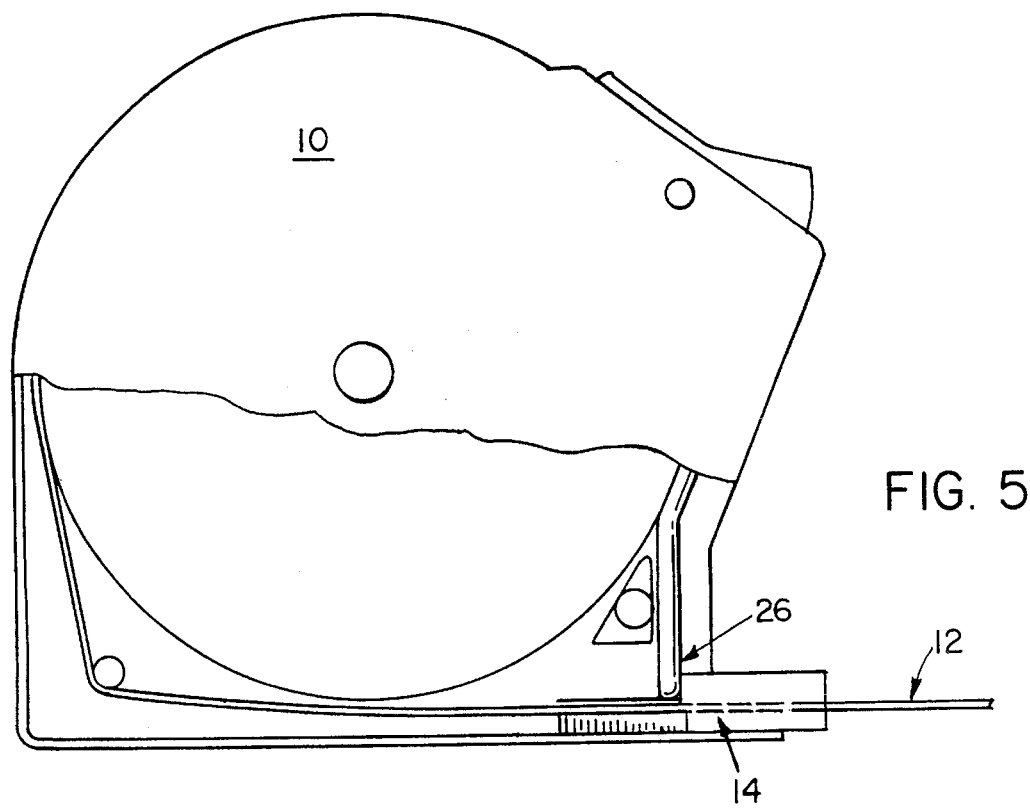
FIG. 5 shows a side view of the fixture while retracted within the housing of the tape measure.

In a third preferred embodiment, shown in FIG. 5, the fixture 14 is inserted into the housing 10 for storage by sliding the fixture into an expanded opening in the housing through which the tape blade also passes. In a tape measure containing a locking mechanism of the type shown in FIG. 5, containing a locking shoe 26 which bears on the tape blade 12, the locking shoe may be moved down toward the tape blade into the position shown in FIG. 5, in which position the tape blade is effectively locked into its current position within the housing 10.

It is thought to be preferable for the locking shoe to bear on the tape blade directly without pressing on the indicator, thus avoiding damaging the indicator or separating it from the base. Thus, in the embodiment shown in FIG. 4B, the indicator has a uniformly narrow configuration. As seen in FIG. 6C the locking show has a cut-away center portion so that the sides of the shoe bear on the tape blade 12 without engaging the indicator 22.

Figures 6A, 6B:
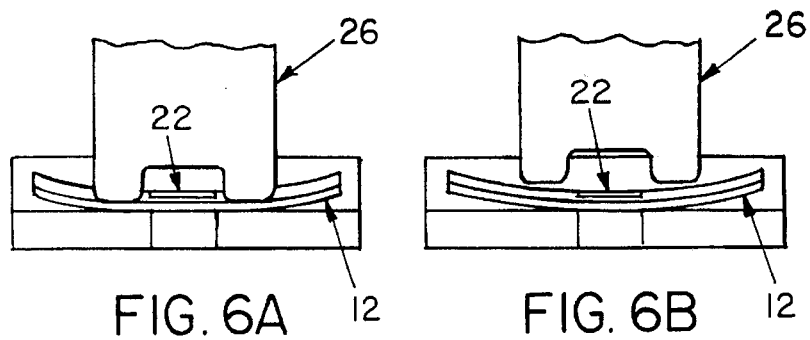
FIG. 6A shows a front view of the locking mechanism in locked position with the first preferred embodiment of the fixture.
FIG. 6B shows a front view of the locking mechanism in open position with the first preferred embodiment of the fixture, with the fixture restrained from withdrawing from the housing.

FIG. 6B shows the shoe raised from the tape sufficiently so that the tape can run freely.

While the invention has been described with reference to specific embodiments, it will be apparent that improvements and modifications may be made within the purview of the invention without departing from the scope of the invention defined in the appended claims.

I claim:

1. A fixture for use in conjunction with a tape measure of the type having ruled calibrations on a tape blade having a free end extending from a housing, the fixture having a longitudinal axis, a width, and a height, comprising:

(a) a base portion containing a slot through which the tape blade can pass parallel to the longitudinal axis of the fixture;

(b) a nose portion affixed to the base portion, the nose portion extending along the longitudinal axis of the fixture, the height of said nose portion extending to below the location of the slot in the base portion; and the nose portion having an end; and (c) a flexible indicator portion having a free end and a secured end, said indicator being rigidly affixed at the secured end to the base portion above the slot, the indicator being oriented parallel to the longitudinal axis of the fixture and extending at the free end exactly to the nose portion end, so that when the tape blade is inserted in the slot, the indicator lies parallel to the tape blade, whereby when the free end of the tape blade is aligned with one end of the distance to be measured and the nose portion end of the fixture is aligned with the other end of the distance to be measured, and the tape blade is bent upward and away from the nose portion, the indicator end aligns itself with the calibration on the tape blade corresponding to the distance to be measured.

2. The fixture of claim 1, wherein the indicator is tapered to be narrower at the free end than at the secured end so that said end of the indicator lies flat against the center portion of the tape blade when the tape blade is bent upward and away from the nose portion, enhancing the accuracy of the reading of the calibrations of the tape measure.

3. A tape measure containing the fixture of claim 1, further comprising:

(a) a tape blade containing calibrations, said tape having a free end and a secured end, the tape being wound around a drum having an axis of rotation, with the secured end of the tape at the axis of rotation, and said tape blade passing through the slot in said fixture at the free end; and (b) a housing having an opening through which the tape blade passes from within the housing to without the housing.

4. The tape measure of claim 3, wherein the fixture may be retained within the housing when the tape measure is not in use.

5. The tape measure of claim 4, wherein the housing contains a floor portion adjacent to the opening, the floor portion running parallel to the tape as the tape passes from within the housing to without the housing, further comprising a door in said floor portion, said door having a size sufficient to permit the entry of the fixture within the housing so that the fixture can be stored within the housing when not in use.

6. The tape measure of claim 4, wherein the opening in the housing is of a size sufficient to permit the entry of the fixture within the housing so that the fixture can be stored within the housing when not in use.

7. The tape measure of claim 6, wherein the tape measure further comprises a locking shoe having a locked position and an unlocked position, wherein in the locked position the shoe pressurably bears upon the indicator near the opening in the housing, pressing said indicator against the tape blade, and the tape blade against the housing so that the tape is thus constrained against moving relative to said housing.

8. The tape measure of claim 6, wherein the tape measure further comprises a locking shoe having a locked position and an unlocked position, wherein in the locked position the shoe pressurably bears upon the tape adjacent to the opening in the housing, pressing said tape against the housing so that the tape is thus constrained against moving relative to said housing.

* * * * *